United States Patent
He et al.

(10) Patent No.: US 6,819,429 B2
(45) Date of Patent: Nov. 16, 2004

(54) MULTI-PASS OPTICAL SPECTRUM ANALYZER HAVING A POLARIZATION-DEPENDENT TUNABLE FILTER

(75) Inventors: Gang He, Sainte-Foy (CA); Daniel Gariépy, Stoneham (CA); Gregory Walter Schinn, Quebec City (CA); Martin Lamonde, Quebec (CA)

(73) Assignee: EXFO Electro-Optical Engineering Inc., Vanier (CA)

( * ) Notice: Subject to any disclaimer, the term of this patent is extended or adjusted under 35 U.S.C. 154(b) by 350 days.

(21) Appl. No.: 09/827,141

(22) Filed: Apr. 6, 2001

(65) Prior Publication Data

US 2002/0145803 A1 Oct. 10, 2002

Related U.S. Application Data

(60) Provisional application No. 60/195,204, filed on Apr. 7, 2000.

(51) Int. Cl.[7] .................................................. G01B 9/02
(52) U.S. Cl. ...................................... 356/454; 356/519
(58) Field of Search ................................ 356/454, 519, 356/491

(56) References Cited

U.S. PATENT DOCUMENTS

| | | |
|---|---|---|
| 3,729,261 A | 4/1973 | Sandercock |
| 3,924,201 A | 12/1975 | Crowe |
| 4,014,614 A | 3/1977 | Sandercock |
| 4,225,236 A | 9/1980 | Sandercock |
| 4,551,019 A | 11/1985 | Vella et al. |
| 4,556,314 A | 12/1985 | Stone |
| 4,710,022 A | 12/1987 | Soeda et al. |
| 4,984,884 A | 1/1991 | Ryu et al. |
| 5,199,042 A | 3/1993 | Papetti et al. |
| 5,390,017 A | 2/1995 | Ozeki et al. |
| 5,406,368 A | 4/1995 | Horiuchi et al. |
| 5,751,482 A | 5/1998 | Challener, IV |
| 5,969,806 A | 10/1999 | Bergano |
| 6,075,647 A | 6/2000 | Braun et al. |
| 6,243,170 B1 * | 6/2001 | Ershov ........................ 356/519 |

OTHER PUBLICATIONS

Sandercock, J.R., "The Design and Use of a Stabilised Multi–passed Interferometer of High Contrast Ratio" in the published Proceedings of the Second International Conference of Light Scattering in Solids, Flammarion, Paris, pp. 9 to 12, 1971.

Vobis, Joachim and Derickson, Dennis, "Optical Spectrum Analysis", Chapter 3, pp. 87–115.

Ogusu, M., et al., "A Thermally Stable Fabry–Perot Tunable filter for 1 Å–Spaced High–Density WDM Systems", IEEE Photonics Technology Letter, vol. 5, No. 10, pp. 1222–1224, Oct. 1993.

Durvasula, L.N., et al., "Pressure–scanned three–pass Fabry–Perot interferometer", Applied Optics, vol. 17, No. 20, pp. 3289–3303, Oct. 15, 1978.

(List continued on next page.)

*Primary Examiner*—Samuel A. Turner
(74) *Attorney, Agent, or Firm*—Thomas Adams (57) ABSTRACT

A polarization independent optical spectrum analyzer comprises an inherently polarization sensitive angle-tuned filter element and polarization-maintaining multi-pass optics for directing a light beam to and fro through the tunable filter element while maintaining its linear state of polarization. The optical spectrum analyzer comprises such a tunable optical filter in combination with a polarization control unit for decomposing a light beam for analysis into first and second beams having mutually orthogonal states of polarization (SOPs) and then adjusting one or both SOPs so that they are parallel to each other and to one of the principal axes of the angle-tuned filter which selects different wavelengths of the first and second light beams. The first and second light beams are passed through the filter repeatedly by multi-pass polarization-maintaining optics.

12 Claims, 5 Drawing Sheets

OTHER PUBLICATIONS

Royhoudhuri, Chandrasekhar, and Hercher, Michael, "Stable multi–pass Fabry–Perot interferometer: design and analysis", applied Optics, vol. 16, No. 9, pp. 2514–2520, Sep. 1977.

Harley, R.T., "Optical alignment of a multipass Fabry–Perot Brillouin scattering spectrometer", J. Phys. E: Sci. Instrum., vol. 12, pp. 255–256, 1979.

Daehler, Mark, and Roesler, F.L., "High Contrast in a Polyetalon Fabry–Perot Spectrometer", Applied Optics, vol. 7, No. 6, pp. 1240–1241, Jun. 1968.

Frenkel, Anatoly and LIN, Chinlon, "Tuned Etalon Filters for Optical Channel Selection in High Density Wavelength Division Multiplexed Systems", Journal of Lightwave Technology, vol. 7, No. 4, pp. 614–624, Apr. 1989.

Sandercock, J.R., "Some Recent Developments in Brillouin Scattering", RCA Review, vol. 36, pp. 89–107, Mar. 1975.

Möller, Lothar and Kogelnik, Herwig, PMD Emulator Restricted to First and Second Order PMD Generation, ECOC '99, Sep. 1999.

Frenkel, Anatoly and LIN, Chinlon, "Multiple Angle–Tuned Etalon Filters for Optical Channel Selection in Wavelength–Division Multiplexed and Optical Frequency–Division Multiplexed Direct Detection Transmission Systems", Opt. Lett. vol. 13, No. 8, pp. 684–686, Aug. 1988.

* cited by examiner

MULTI-PASS OPTICAL SPECTRUM ANALYZER HAVING A POLARIZATION-DEPENDENT TUNABLE FILTER

This application claims priority from U.S. Provisional patent application No. 60/195,204 filed Apr. 7, 2000.

TECHNICAL FIELD

The invention relates to optical analyzers comprising a tunable optical filter and to multi-pass optics for passing a light beam repeatedly through the tunable optical filter.

BACKGROUND ART

With the development of High Density Wavelength Division Multiplexing (HDWDM) applications, for example as used in communications conducted via optical fiber transmission mediums, the need for quality optical spectrum receivers and analyzers has become acute. In particular, there is a demand for optical spectrum analyzer (OSA) instruments that are robust, compact and yet display a sufficient optical dynamic range. This is particularly so for portable instruments that are to be used in the field.

As described in the text book "Optical Spectrum Analysis", authored by Joachim Vobis and Dennis Derickson, the three main optical filter technologies that have been used in optical spectrum analyzers (OSAs) are diffraction-gratings, Michelson interferometers and tunable Fabry-Perot optical filters.

Diffraction-grating technology is the most widely used for OSA's in fiber testing equipment. Many efforts have been made to improve the optical dynamic range and the robustness of such devices. For example, approaches to improve the optical dynamic range include the use of double monochromators or the use of a double pass/double filtering process to make the lines sharper. A multi-pass and single filtering approach has resulted in a relative improvement of the optical dynamic range by narrowing the bandwidth. These instruments, however, require very precise rotation of the grating and place tight requirements on the stability of the mechanical structure, resulting in large and more fragile instruments. Robustness has been improved by developing instruments in which the detector is moved rather than the grating rotated, or even using a detector array which results in a device with no moving parts. However, these more robust instruments are found to have a limited optical dynamic range and the wavelength range is limited by the viewing angle of the lens system used.

The Michelson interferometer technology provides high wavelength selection precision and good spectral resolution, but the robustness remains a challenge and optical dynamic range limitations of such instruments continue to present problems. For example, the maximum optical dynamic range presently achievable is in the order of 35 dB, which is far less than what is desired.

OSA's using tunable Fabry-Perot filters are usually compact and rugged in nature. The various designs require trade-offs, however, between resolution, free spectral range and optical dynamic range. Optical dynamic range can be improved by using multi-cavity filters, or cascading filters or by the multiple passes through the filter. However, when manufacturing multi-cavity filters using coating techniques, it is quite difficult to match the cavities. Three-cavity filters are presently available with a spectral resolution (FWHM) of 0.5 to 1.0 nm. The paper entitled "Multiple Angle-Tuned Etalon Filters for Optical Channel Selection in Wavelength Division Multiplexed and Optical Frequency Division Multiplexed Direct Detection Transmission Systems" by Anatoly Frenkel and Chinlon Lin—Opt. Lett. Vol. 13, pp 684–686, 1988 describes instruments with cascaded identical filters and cascaded nonidentical filters. Although individual angle-tuned filter elements exhibit properties apparently suitable for optical wavelength discrimination, generally, to cascade two or more filters is complicated because of inter-cavity interference problems. Also, when non-identical filters are cascaded, tuning synchronization may present problems.

Multi-pass filters are disclosed in the paper entitled "The Design and Use of a Stabilised Multi-passed Interferometer of High Contrast Ratio" by J. R. Sandercock in the published Proceedings of the Second International Conference of Light Scattering in Solids, Plammarion, Paris, pp 9 to 12, 1971, and U.S. Pat. No. 3,729,261 which issued on Apr. 24, 1973 naming John R. Sandercock as an inventor. Sandercock describes a 5-pass filter configuration which uses a pair of corner cube retroreflectors. As corner cube retroreflectors cannot maintain the polarization states between the input and output beams, the filter used must be polarization-insensitive in both insertion loss and wavelength splitting. Since angle-tuned filter elements are polarization-sensitive, they cannot be used.

A wide spectrum of optical energy, from infrared through the visible spectrum, is commonly used as a means of conveying information via various optical fiber transmission media. In the telecommunications industry optical semiconductor lasers are typically used as light sources. Although the beam emitted by an optical laser tends to be of a fixed linear polarization, the emitted beam is typically received after having traversed various optical fiber conduits, so the received beam's state of polarization is not accurately predictable. The received beam's state of polarization may vary in an unpredictable manner over a period of time. Because angle-tuned filters are inherently polarization sensitive, they are not practical for use in detecting the spectral characteristics of such a beam of unknown or unpredictable polarization. Were it not for the fact that they are polarization sensitive, however, it would be desirable to use such an angle-tuned filter in an optical spectrum analyzer.

DISCLOSURE OF INVENTION

In this specification, the term "light" will be used for electromagnetic energy such as that suitable for use for optical communications, including infrared and visible light.

In accordance with the present invention, there is provided an optical spectrum analyzer apparatus comprising:

an inherently polarization-sensitive tunable filter element;

polarization-maintaining optical means for defining paths whereby a light beam is directed to traverse the polarization-sensitive tunable filter element a predetermined number of times;

a polarization control module for receiving input light for analysis, decomposing the received input light into its ordinary and extraordinary components to produce first and second light beams having respective mutually orthogonal linear states of polarization, and applying the first and second light beams to the tunable filter element by way of the optical means with their states of polarization parallel to each other and to one of the principal axes of the tunable filter element, means for adjusting the tunable filter element to select different wavelengths of the input light; and means for detecting the first and second light beams leaving the tunable filter element and detecting energy at each of said different wavelengths, wherein the polarization control module comprises means for rotating the state of polarization of at least one of the first and second light beams relative to the state of polarization of the other of the first and second light beams before application to the tunable filter element, said rotating means comprising at least one polarization-maintaining fiber.

The polarization-maintaining multi-pass optical means may comprise a pair of right-angle reflectors each having a pair of reflective surfaces arranged at right angles to each other and juxtaposed so that a light beam incident one of the reflectors substantially obliquely to one of the reflective surfaces thereof is reflected by both reflective surfaces thereof to emerge substantially parallel to the direction of incidence, being incident the other reflector obliquely to one of its surfaces and being reflected by both surfaces to emerge substantially parallel to the direction of incidence, the arrangement being such that the light beam is reflected by each reflector surface a predetermined number of times and an equal number of times in each direction of rotation, the arrangement being such that inaccuracies in the angle between each pair of the reflective surfaces are compensated.

The tunable filter may be an inherently polarization-sensitive filter, for example, an angle-tunable filter, such as an angle-tunable Fabry-Perot filter, or an angle-tuned thin film dielectric filter.

The polarization-maintaining multi-pass optical means may include a pair of right-angle reflectors juxtaposed so that the two light beams each can be made to reflect back and forth between them a predetermined number of times.

The pair of right-angle reflectors may each have an apex and a base, with the bases juxtaposed so that each of the two light beams can be made to reflect back and forth between the right angle reflectors a predetermined number of times. A region adjacent the apex of one of the right angle reflectors may be a planar surface parallel with the base, for either receiving the two light beams and emitting the reflected light beam, or vice versa.

With such an arrangement, any polarization-dependent characteristics of the optical filter element will affect both light beam components equally.

Multi-pass optics which use a pair of right-angle reflectors are susceptible to errors caused by deviation of the reflective surface from a true right angle, causing misalignment of the light beam in proportion to the number of reflections. This problem is addressed by an aspect of the invention in which a polarization-maintaining multi-pass optical means comprises a pair of right-angle reflectors each having a pair of reflective surfaces arranged at right angles to each other and juxtaposed so that a light beam incident upon one of the reflectors substantially obliquely to one of the reflective surfaces thereof is reflected by both reflective surfaces thereof to emerge substantially parallel to the direction of incidence, being incident upon the other reflector obliquely to one of its surfaces and being reflected by both surfaces to emerge substantially parallel to the direction of incidence, the arrangement being such that the light beam is reflected by each reflector surface a predetermined number of times and an equal number of times in each direction.

An advantage of this arrangement is that, any unwanted deviation caused by inaccuracy in the right-angle when the beam is reflected a first time, will be corrected when the beam is reflected in the opposite direction at the same surface. Hence, errors are not simply added in proportion to the number of reflections.

In various embodiments of the different aspects of the invention, the pair of right angle reflectors may comprise any of Porro prisms, pi prisms or hollow roof mirrors.

BRIEF DESCRIPTION OF THE DRAWINGS

Embodiments of the invention will now be described by way of example only and with reference to the accompanying drawings, in which.

BEST MODES FOR CARRYING OUT THE INVENTION

In the drawings, identical or corresponding elements in the different Figures are identified with the same reference number.

Figure 1:
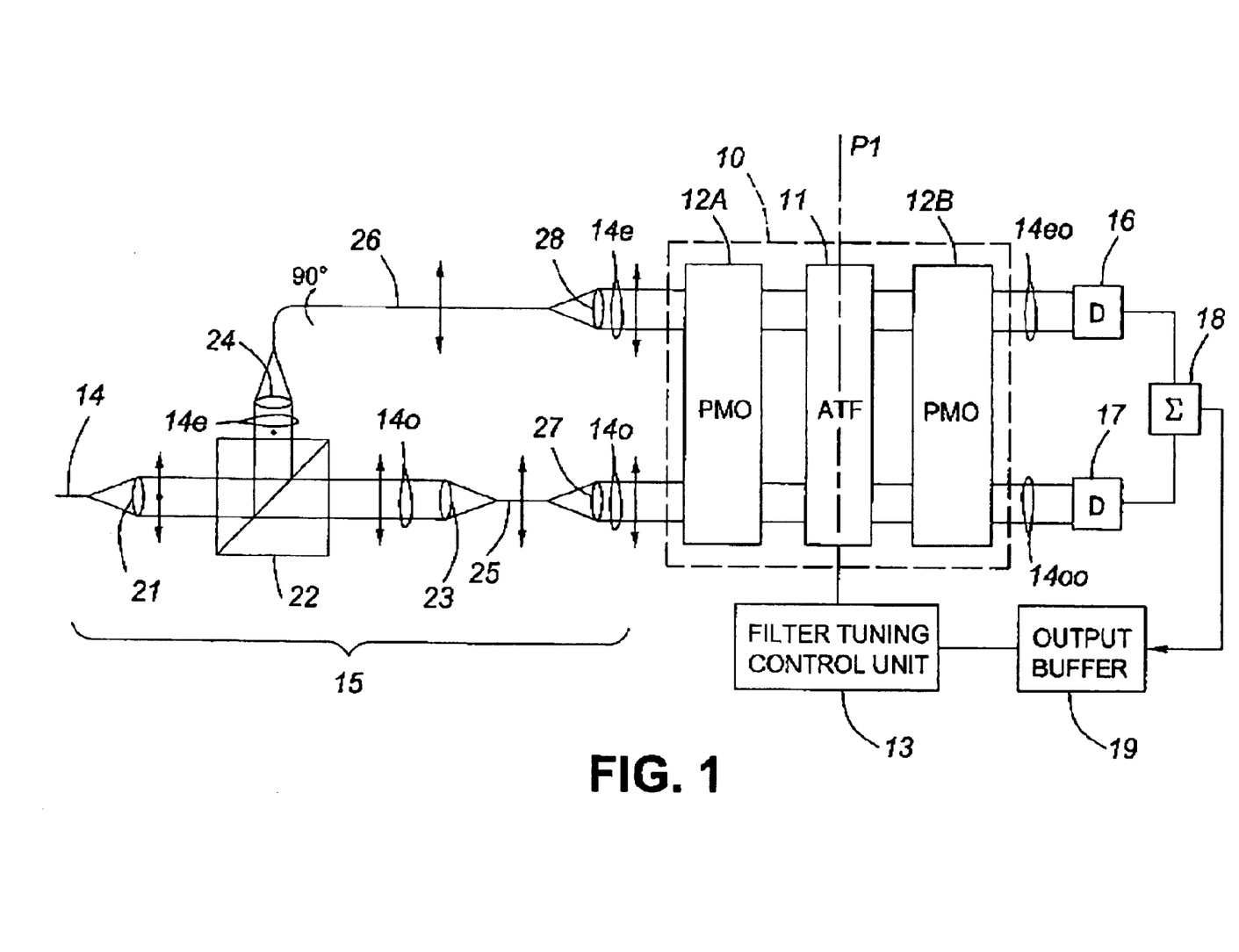
FIG. 1 is a schematic block diagram of an optical spectrum analyzer comprising a polarization control module, a multi-pass tunable optical filter unit and polarization-dependent filter element.

In various of the Figures, the filter element is depicted as being an angle-tuned filter. As mentioned above, angle-tuned filters are wavelength tunable, but have the disadvantageous characteristic being polarization-sensitive. The multi-pass optical spectrum analyzer with a polarization-sensitive angle-tuned filter unit shown in FIG. 1 overcomes this problem by converting orthogonal components of the input light beam into two linearly-polarized light beams, rotating the polarization state of either or both of the beams so that they are parallel, and, using polarization-maintaining multi-pass optics, directing the two light beams through the filter. Thus, the optical spectrum analyzer comprises a multi-pass tunable optical filter unit 10 formed by an angle-tuned filter element 11 and multi-pass optics parts 12A and 12B, and a control unit 13 which controls the angle of the filter element 11 in known manner to select different wavelengths (actually narrow spectral bands). The tuner filter element 11 is disposed between the multi-pass optics parts 12A and 12B. Linearly-polarized light enters the multi-pass optics part 12A which directs it through the tunable filter element 11 a first time to the multi-pass optics part 12B, with its state of polarization parallel to one of the principal axes of the filter element 11 and to a preferred plane of incidence through the multi-pass optics parts 12A and 12B, as will be described later. The latter returns the light through the tunable filter element 11 in the reverse direction. The multi-pass optics parts 12A and 12B repeat this process several times until the light emerges from one of them. In FIG. 1, the light is shown leaving optics part 12B, but that is optional; it could leave via optics part 12A. As will be described in more detail later, the multi-pass optics parts 12A and 12B are configured so that, providing the state of polarization of the light beam is parallel or perpendicular to the particular orientation of the optics, it remains the same during traversals of the tunable filter element 11.

The principal axes are perpendicular to each other in the plane of incidence. Hence, in FIG. 1, the first principal axis P1 extends north-south in the plane of the paper and the second principal axis (not shown) extends perpendicular to the paper. The ATF 11 is shown being rotated about an axis parallel to the principal axis P1.

The input light is first decomposed into its ordinary and extraordiary component light beams having mutually orthogonal linear states of polarization and both light beams are passed through the multi-pass optics 12A/12B and the tunable filter element 11 with their states of polarization parallel to each other and one of the principal axes of the filter element 11 so that they follow identical paths but offset one laterally relative to the other.

The optical spectrum analyzer illustrated in FIG. 1 advantageously permits an efficient use of a polarization sensitive filter. In FIG. 1, the optical spectrum analyzer is shown to be receiving a light beam 14, which may include wavelengths anywhere from the infrared through the visible spectrum, for example those wavelengths which are used for high density wavelength division multiplexed (HDWDM) telecommunications. The optical spectrum analyzer includes a polarization control module (PCM) 15, the multi-pass tunable optical filter unit 10, a pair of detectors 16 and 17, and an adder 18. In addition to controlling the filter element 11 to select different wavelengths, or to scan a spectral band of interest over a period of time, the filter control unit 13 controls an output buffer 19. The PCM 15 splits the light beam 14 into two light beam components 14o and 14e which, initially, are linearly polarized but in orthogonal directions, x and y, and then rotates one or both of them until their states of polarization are parallel to each other and to one of the principal axes of the tunable filter element 10. This entails relative rotation of the states of polarization through 90 degrees since the light beams 14o and 14e are orthogonal to each other at the outset.

Assuming for convenience of discussion that the light beam 14o with the ordinary state of polarization is already aligned with the principal axis of the optical filter element 11, the state of polarization of light beam 14e must be rotated through a quarter turn in the PCM 15. The two light beam components 14o and 14e pass via mutually exclusive paths through the multi-pass tunable optical filter unit 10 and the selected wavelengths leave the optical filter unit 10 via paths 14eo and 14oo and impinge upon the detectors 16 and 17, respectively, which detect their energy intensities $P_{r'}$ and $P_{r'}$. Corresponding electrical output signals from the detectors 16 and 17 are combined in the adder 18 to provide a combined intensity P of the beams: $P=AP_{r'}+BP_{r'}$. If a precise value is not critical, the electrical signals are summed by the adder 18 to provide an electrical indication of energy in a spectral band about the tuned wavelength. For polarization independence, the detectors 16 and 17 are calibrated using known references, i.e. by rotating a reference linearly-polarized light beam until the output of detector 16 is a maximum and the output of detector 17 is a minimum, and vice versa.

The optical filter element 11 may conveniently comprise a polarization-sensitive angle-tuned etalon filter, for example a Fabry-Perot filter. The filter tuning control unit 13 adjusts the filter element 11 to select a narrow spectral band. For spectrum analysis, the filter tuning control unit 13 will be operated to cause the filter element 11 to sequentially and repeatedly select narrow spectral bands from across the entire potential spectrum of the light beam and scan a spectrum bandwidth of interest, perhaps to ascertain the functionality of a transmission system under test. The output from the adder 18 then is stored in the output buffer 19 in association with spectral tuning information, received from the filter tuning control unit 13 via a lead 20. Information stored in the buffer 19 is available for use by any convenient computer controlled apparatus or information sampling apparatus, not shown or discussed herein. Also in the discussion of the remaining Figures, particulars of tuning arrangements are not discussed as these are of knowledge to persons skilled in this art.

The optical dynamic range of the optical spectrum analyzer is improved by passing each light beam through the optical filter element 11 several times, which is achieved by the multi-pass optical filter unit 10 as shown in FIG. 1.

Although the optical spectrum analyzer shown in FIG. 1 is especially suitable for use with polarization-sensitive filters, it is envisaged that the angle-tuned filter 11 might be replaced by a polarization insensitive filter. In this specification, "polarization-sensitive" means one or more of (I) polarization-dependence of peak transmission wavelength; (ii) polarization-dependence of spectral passband (width); (iii) polarization-dependence of peak transmission at peak wavelength.

FIG. 1 illustrates one suitable example of PCM 15. Conventional polarization notation indicates states of polarization of light beams illustrated in FIG. 1. The PCM 15 is shown as receiving the input light beam 14, which may be of unknown state of polarization. A lens 21 collimates the input light beam 14 and directs the collimated light beam toward a polarization beam splitter 22, conveniently a birefringent element. The beam splitter 22 decomposes the collimated beam into its ordinary and extraordinary components to provide two light beams 14o and 14e having mutually orthogonal linear states of polarization. The light beams 14o and 14e are focused by lenses 23 and 24, respectively, into polarization-maintaining optical fibers 25 and 26. The opposite ends of the fibers 25 and 26 direct the beams 14o and 14e towards the MPATF unit 10 and are oriented relative to the MPATF unit 10 so that the two beams 14o and 14e will be incident upon the tunable filter element 11 with their states of polarization parallel to each other and aligned with one of the principal axes of the tunable filter element 11. Since the light beams 14o and 14e enter the fiber 25 and 26 with their states of polarization orthogonal, the fibers 25 and 26 must provide 90 degrees of relative rotation of the states of polarization. In FIG. 1, fiber 26 is shown twisted through 90 degrees relative to fiber 25. In practice, of course, either or both of the fibers could be twisted to produce the required rotation.

As they leave the fibers 25 and 26, the light beams 14o and 14e are collimated by two collimating lenses 27 and 28, respectively, and are applied to the MPATF 10.

Figure 2:
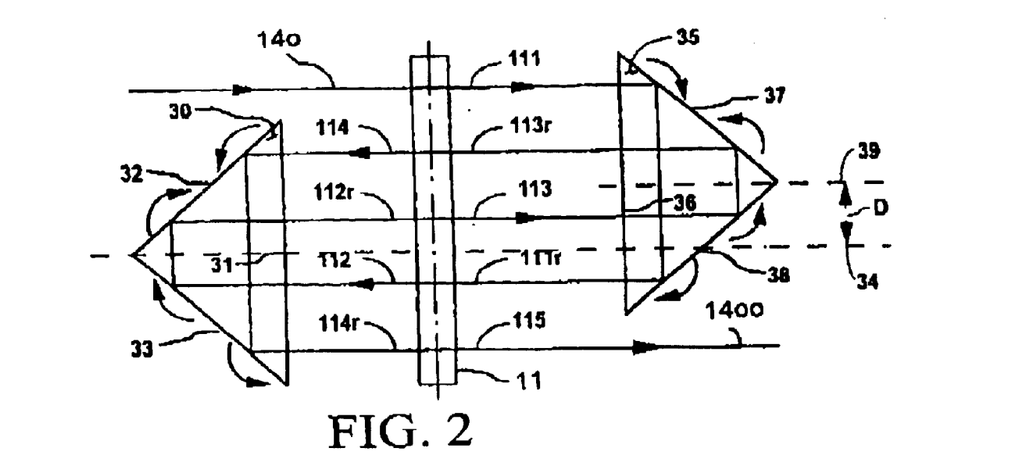
FIG. 2 is a schematic side view diagram which illustrates a beam path in the multi-pass optics of the angle-tuned filter unit of FIG. 1 and which provide an odd number of passes through the filter element.
Figure 4:
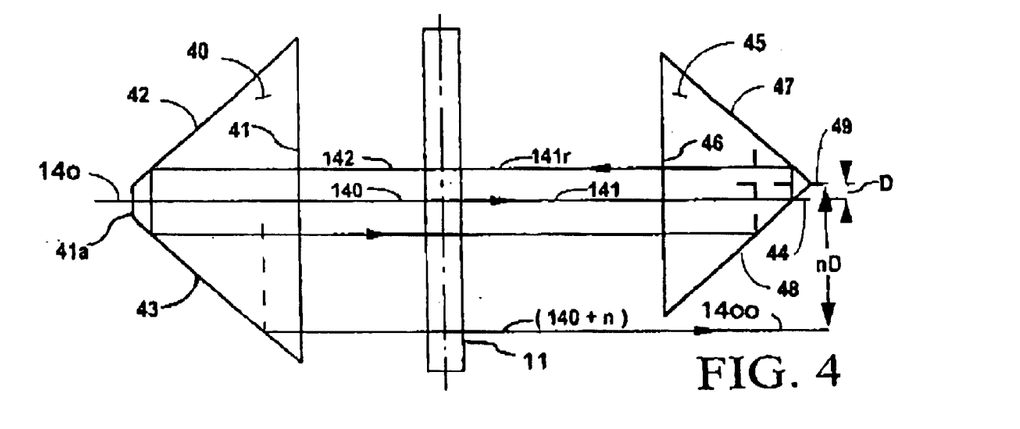
FIGS. 4 and 5 are schematic side view diagrams which generally illustrate examples of beam paths in alternative multi-pass angle-tuned filter units which provide an odd numbers of passes and an even number of passes.

Whereas the OSA shown in FIG. 2 has two detectors 16 and 17 connected to the outputs of the MPATF 13, FIG. 4 illustrates a modified OSA in which a single detector 16 is provided at the input of the OSA. The detector 16 and the input light beam 14 are coupled to respective inputs of a coupler or circulator 29. The output of the coupler/circulator 29 is coupled to the input of the PCM 15. The MPATF 10 is configured to return the output light beams 14oo and 14eo along the paths taken by the input light beams 14o and 14e, respectively. A suitable configuration of such a MPATF 10 will be described later with reference to FIG. 10A. An advantage of the configuration shown in FIG. 4 is that only one detector 16 is needed.

FIGS. 2 to 6B illustrate various configurations suitable for the multi-pass angle-tuned filter unit 11. In the multi-pass angle-tuned filter unit of FIG. 2, the path taken by only one of the collimated light beams, namely light beam 14o, is represented, for convenience of illustration, as a simple line. Also illustration of any additional collimating lens element as may be appropriate along entry and exit light paths is omitted. It should be appreciated from FIG. 1, which shows the collimated light beam 14o and 14e, in plan view, to be side by side, that the path taken by the collimated light beam 14e, though not shown in FIG. 2, follows an identical path displaced laterally behind the path taken by the beam 14o. The multi-pass optics parts 12A and 12B in FIG. 1, are represented in FIG. 2 as right angle solid reflectors 30 and 35. Some examples of preferred right angle reflectors are porro prisms, pi prisms and hollow roof mirror. In this example, the reflectors 30 and 35 are porro prisms, illustrated in section to each have the form of a right angle isosceles triangle with bases 31 and 36 arranged spaced apart in substantially parallel relationship with respect to one another. The reflector 30 has reflective surfaces 32 and 33 which meet at a right angle apex as shown. The reflector 35 has reflective surfaces 37 and 38 which meet at a right angle apex as shown. The angle-tuned filter element 11 is positioned between the bases 31 and 36 and extends beyond each. The reflectors 30 and 35 are shown with centre planes indicated by broken lines 34 and 39 respectively, which extend through their apexes and are parallel and vertically separated by a distance "D". Suitable mounting structures for maintaining the angle-tuned filter element 11 and the reflects 30 and 35 in the required position are well known to persons skilled in the optical arts and are not discussed.

The light beam 14o is shown to follow a path line 111, which is generally parallel to centre plane 39, to traverse the angle-tuned filter element 11 and thus complete a first pass therethrough. The path line 111 intersects with the reflective surface 37 at about 45° and thence crosses to the reflective surface 38 which it leaves along a reflected path line 111e. Each time the light beam is reflected, its propagation direction is, in effect, rotated through 90 degrees in the plane of incidence. For convenience, the direction of such rotation will subsequently be deemed to be clockwise or counter clockwise about the reflection point. The pair of reflections at the surfaces 37 and 38 cause the beam path to be redirected through 180° in a clockwise direction. The reflected path line 111e traverses the angle-tuned filter element 11 in the opposite direction so that the beam completes a second pass therethrough to emerge along a path line 112. The path line 112 intersects the reflective surface 33 at about 45° and thence crosses to the reflective surface 32 which it leaves along a reflected path 112r. The pair of reflections at the surfaces 33 and 32 cause the beam to be redirected through 180°, again in a clockwise direction. The reflected path line 112r traverses the angle-tuned filter element 11 so that the beam completes a third pass therethrough to emerge along a path line 113. The path line 113 intersects the reflective surface 38 and thence crosses to the reflective surface 37 which it leaves along a reflected path line 113r. The pair of reflections at the surfaces 38 and 37 cause the beam to be redirected through 180° yet again. This time, however, the reflection is in an opposite direction, i.e. counter-clockwise. The reflected path line 113r traverses the angle-tuned filter element 11 so that the beam completes a fourth pass therethrough to emerge along a path line 114. The path line 114 intersects with the reflective surface 32 at about 45° and thence crosses to the reflective surface 33 which it leaves along a reflected path line 114r. The pair of reflections at the surfaces 32 and 33 cause the beam to be redirected through 180°, again in the counterclockwise direction. The reflected path line 114r traverses the angle-tuned filter element 11 so that the beam completes a fifth pass therethrough to emerge along a path line 115. Referring back to FIG. 1 for a moment, the output beam 14o' on path 115 corresponds to light beam 14o, which is detected by the detector 16.

It should be noted that for each pair of reflections at one pair of the reflective surfaces 32,33 or 37,38 which rotate the beam propagation direction clockwise, there is a complementary pair of reflections at the same pair of reflective surfaces which rotate the beam propagation direction counterclockwise. Consequently, any errors in the beam orientation caused by inaccuracies in the angle between a particular pair of the reflective surfaces 32,33 or 37,38 will be corrected.

Figure 3:
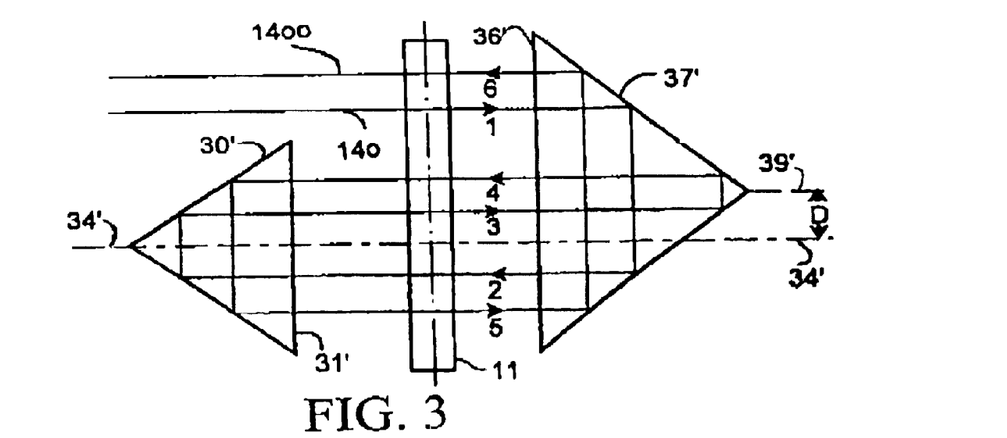
FIG. 3 is a schematic side view diagram which illustrates a beam path in a multi-pass angle tuned filter unit similar to that shown in FIG. 1, but which provides an even numbers of passes.

Whereas the multi-pass optical elements of FIG. 2 cause the light beam to traverse the filter element 11 an odd number of times, the multi-pass angle-tuned filter unit illustrated in FIG. 3 causes the light beam to traverse the filter element 11 an even number of times. The elements of the MPATF shown in FIG. 3 are similar to those of the MPATF shown in fight FIG. 2 and so have the same reference number, but with a prime. In the MPATF in FIG. 3, the base 31' of reflector 30' is significantly shorter than the base 36' of reflector 37' to allow room for the input beam 14o and the output beam 14oo to enter and leave, respectively, reflector 37'. The path taken by the light beam is clear from FIG. 3 and so will not be described.

Figure 5:
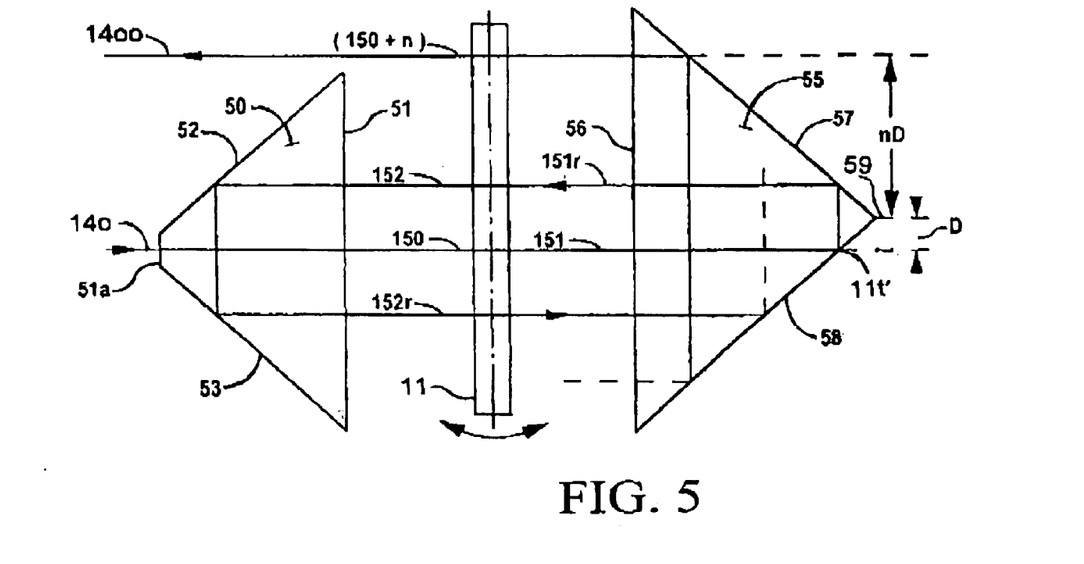

FIGS. 4 and 5 illustrate alternative configurations of MPATF. In FIG. 4, each of optical elements 40 and 45, be they prisms or mirrors, is capable of reflecting through 180° a light beam incident normal to its base. In this example, an apex of reflective surfaces 42 and 43 of element 40 is truncated by a flat surface 41a, parallel to its base 41. The surface 41a provides a portal for accepting a light beam along a beam path 14o into the optical element 40. The beam path in this configuration of the reflectors 41 and 42 is shown to traverse the angle-tuned filter element 11 "n" times, where "n" is an odd number. The optical element 45 includes reflective surfaces 47 and 48 projecting from a base 46 and intersecting each other at a right angle. The angle-tuned filter element 11 is positioned between the bases 41 and 46 and extends beyond each. The elements 40 and 45 are shown with centre planes, indicated by broken lines 44 and 49 respectively, which are spaced apart parallel to each other and separated by a distance "D". The beam path is illustrated as discontinuous since, in this generic example, the odd number of passes through the filter element 11 would be dictated by the actual dimensions of any particular example of this generic form. A path of the light beam 14o is shown to enter the surface 41a along path line 140, traverse the angle-tuned filter element 11, thus completing a first pass therethrough, and thence follow a path line 141. The path line 141 intersects with the reflective surface 48 at a position adjacent the apex and thence crosses to the reflective surface 47, which it leaves along a reflected path line 141r. The reflected path line 141r traverses the angle-tuned filter element 11 so that the beam completes a second pass therethrough in the opposite direction to emerge along a path line 142. Following reflection at surfaces 42 and 43, the light beam traverses the filter element 11 again. Following multiple reflections at the two reflectors, the beam emerges along the beam path labelled (140+n). Thus, an input light beam 14o which has traversed the angle-tuned filter element 11 all "n" times, becomes the beam 14oo, shown to exit left to right, and is intercepted by the detector 16 (shown in FIG. 1). Though the pair of reflectors in FIG. 4 are shown to be generally alike, it is not essential for them to be the same. For example, it is envisaged that a pair of such elements might be a Porro prism and a hollow roofed mirror. In this case, the length of the angle-tuned filter element 11 is at least equal to the length of the base 41, which itself has a length in excess of twice a product "nD", where "n" is an odd number and is the number of traverses of the angle-tuned filter element 11 by the light path.

FIG. 5 illustrates a multi-pass angle-tuned filter unit similar to that shown in FIG. 4 but which causes the light beam to traverse the filter element 11 an even number of times. In the unit shown in FIG. 5, optical elements 50 and 55 comprise a pair of right-angle reflectors each capable of reflecting a beam of light through 180°. In the reflector 50, reflective surfaces 52 and 53 project from the base 51 perpendicular one with respect to the other. The truncated element 50 has a surface 51a parallel to its base 51 for accepting the beam 11o into the optical element 50 near what would otherwise be the apex of the right angled triangle formed by the reflective surfaces 52 and 53 and base 51. Reflector element 55 includes reflective surfaces 57 and 58 projecting from a base 56 and meeting at an apex defining a right angle. The bases 51 and 56 are spaced apart in a parallel relationship and the angle-tuned filter element 11 is positioned between them. The reflectors 50 and 55 are shown with centre planes indicated by broken lines 54 and 59, respectively, which are parallel and spaced apart by a distance "D". The beam 14o enters through the surface 51a following a beam path 150, traverses the angle-tuned filter element 11 to complete a first pass therethrough, and thence follows a path line 151. The path line 151 intersects with the reflective surface 58 and thence crosses to the reflective surface 57 which it leaves, as a reflected path line 151r. The reflected path line 151r traverses the angle-tuned filter element 11 so that the beam completes a second pass therethrough in the opposite direction to emerge along a path line 152. The light beam is reflected back and forth and, following a final reflection from the reflective surface 57, traverses the filter element 11 for the nth time to emerge following the beam path labelled (150+n). Thus, after an even number of traverses, as generically illustrated, and having traversed the angle-tuned filter all "n" times, the input light beam 14o becomes the beam 14oo, shown to exit right to left, and is intercepted by the detector 16 (shown in FIG. 1). The exiting beam path (150+n) is displaced a vertical distance "nD" from the entry beam path 150 through the surface 51a, or stated differently, a distance "(n−1)D" from the centre line or apex plane 59 of the optical element 55. In this particular arrangement, the optical element 55 may be larger than the optical element 50, assuring that the beam is directed to exit the filter element 11 from right to left along the path (150+n) after an even number of passes. In this case the angle-tuned filter element 11 is of greater length than the base 51, that is to be of a length in excess of "2nD".

Figure 6A:
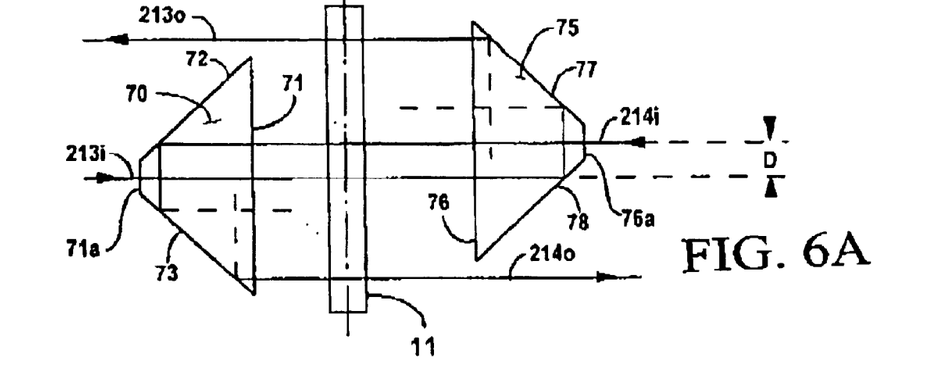
FIGS. 6A and 6B are schematic side and plan view diagrams which illustrate a further example of a multi-pass angle-tuned filter unit.
Figure 6B:
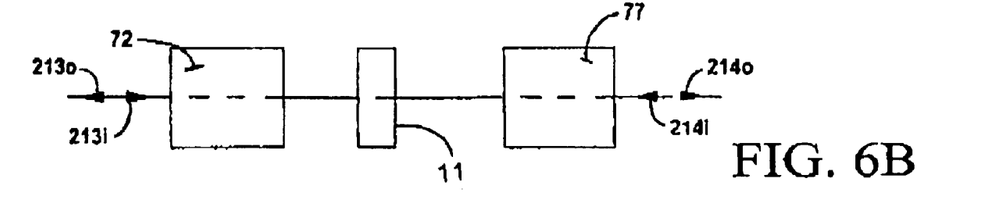

FIGS. 6A and 6B illustrate another variation of the multi-pass angle-tuned filter unit which includes optical reflectors provided by prisms 70 and 75 arranged about an angle-tuned filter element 11. The prism 70 includes reflective surfaces 72 and 73 extending from a base 71 and converging at a right angle truncated by a flat surface 71a, parallel with the base 71. The prism 75 is similar, including reflective surfaces 77 and 78 extending from a base 76 and converging at a right angle truncated by a flat surface 76a, parallel with the base 76. In contrast to the embodiment of FIGS. 2 to 5, two light beams enter the prisms 70 and 75 by way of input paths 213i and 214i, respectively, and exit prisms 75 and 70 by way of output paths 213o and 214o, respectively. In contrast to the previously described examples, these paths are vertically separated but are not necessarily laterally separated. The input path 213i is incident, left to right, into the surface 71a, and traverses the prism 70 and the ATF 11 on a straight line before being directed through 180° by the reflective surfaces 78 and 77. Following multiple reflections by the two prisms 70 and 75, the path emerges from the base 76, a final time, to traverse the ATF 11, from right to left, where it is labelled as the output path 213o. The input path 214i is incident, right to left, upon the surface 76a and traverses the prism 70 and the ATF 11 on a straight line before being directed through 180° by the reflective surfaces 72 and 73. Following multiple reflections by the two prisms 70 and 75, the path emerges from the base 71, a final time, to traverse the ATF 11, from left to right, where it is labelled as the output path 214o. Any light beams having traversed the ATF 11 via either of these beam paths emerge confined to a narrow spectral width as selected by the ATF 11 and are detected by the detectors 16 and 17.

Figure 7A:
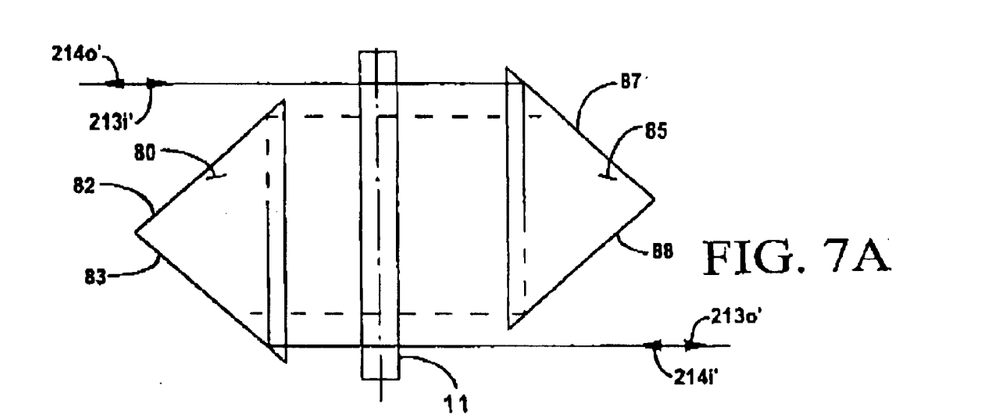
FIGS. 7A and 7B are schematic side and plan view diagrams which illustrate yet a further example of a multi-pass angle-tuned filter unit.
Figure 7B:
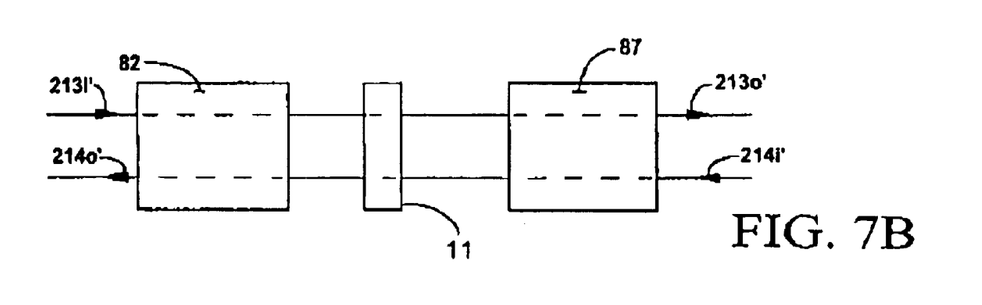

FIGS. 7A and 7B illustrate a variation of the multi-pass angle-tuned filter unit which includes optical reflectors provided by prisms 80 and 85 arranged about an angle-tuned filter element 11 and is suitable for use in the modified OSA described with reference to FIG. 2. The prism 80 includes reflective surfaces 82 and 83 extending from a base and converging at a right angle to intersect along an apex parallel with its base. Likewise, the prism 85 is similar, including reflective surfaces 87 and 88 extending from a base and converging at a right angle to intersect along an apex parallel with its base. Input light beams 14o and 14e are illustrated as following input paths 213i' and 214i', respectively, and paths for both output light beams 11oo and 11eo are illustrated as output paths 213o' and 214o', respectively. In contrast to the example in FIGS. 6A and 6B, these paths are laterally separated but are not necessarily vertically separated. Any light energy having traversed the ATF 11 via either of these beam paths emerges confined to a narrow spectral width as selected by the ATF 11 and are ready for detection.

It should be appreciated that the multi-pass angle-tuned filter units illustrated in FIGS. 2 to 5 could be used in a similar manner with two light beams followed by parallel, laterally-offset paths.

Figure 8A:
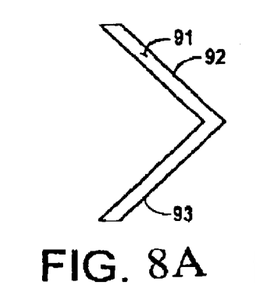
FIGS. 8A and 8B illustrate an example of a hollow roof mirror which may be used in the multi-pass angle-tuned filter units illustrated in FIGS. 2, 3, 7A and 7B.
Figure 8B:
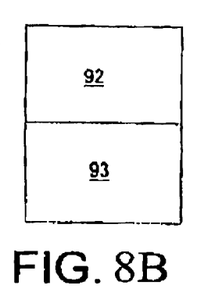

In any of the above-described embodiments, the reflectors could comprise hollow roof mirrors, porro prisms, or pi prisms. FIGS. 8A and 8B illustrate a hollow roof mirror having a body 91 comprising limbs extending normal to one another from an apex to provide reflective surfaces 92 and 93.

Figure 8C:
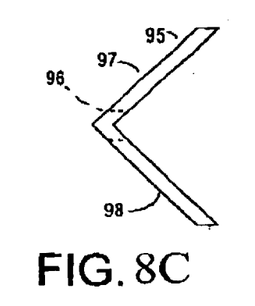
FIGS. 8C and 8D illustrate an example of a hollow roof mirror which may be used in the multi-pass angle-tuned filter units illustrated in FIGS. 4, 5, 6A and 6B.
Figure 8D:
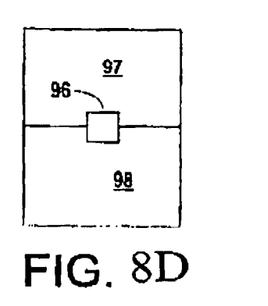

FIGS. 8C and 8D illustrate a hollow roof mirror having a body 94 comprising limbs extending normal to one another from an apex to provide reflective surfaces 95 and 96. In contrast to the hollow roof mirror in FIGS. 8A and 8B, the limbs are interrupted at the apex to define a central opening 96 to facilitate passage of a light beam therethrough, enabling the hollow roof mirrors to be used in the MPATF's shown in FIGS. 4 to 6B.

Figures 9A, 9B:
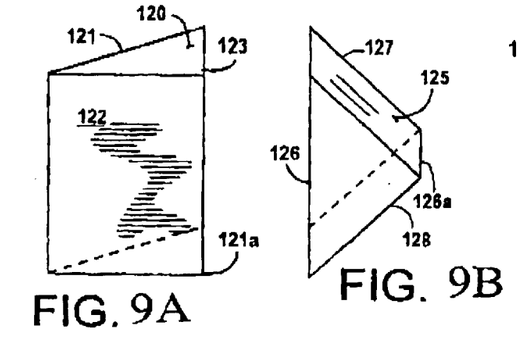
FIGS. 9A and 9B are perspective views of porro prisms which may be used in the multi-pass angle-tuned filter units illustrated in FIGS. 4, 5, 6A and 6B.

The porro prism shown in FIG. 9A comprises a body 120 defined by a base 121 and reflective surfaces 122 and 123 extending convergingly from the base 121 and joined normal to one another along a vertical apex 121a. The porro prism shown in FIG. 9B is similar to the porro prism in FIG. 9A, but it is viewed with its apex 126a in a horizontal position. The porro prism in FIG. 9B comprises a body 125 defined by a base 126 and reflective surfaces 127 and 128 extending convergingly from the base 126 and joined normal to one another along the apex 126a.

Figure 9C:
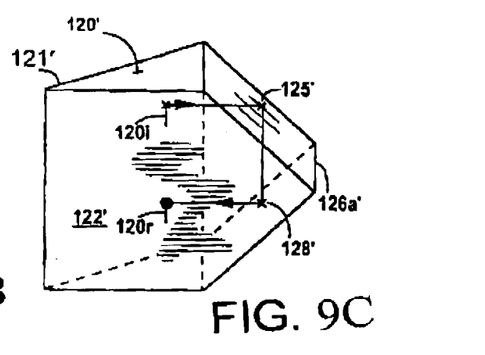
FIG. 9C is a perspective view of pi prism which may be used to provide reflectors in the multi-pass angle-tuned filter unit.

FIGS. 9A and 9B are presented in the particular orientation shown, as an aid to understanding the structure of the pi prism illustrated in the adjacent FIG. 9C. The pi prism is thus illustrated with structural elements labelled with numbers corresponding to those in the FIGS. 9A and 9B, but distinguished with prime notations. The pi prism may be viewed as a combination of two porro prisms orientated as shown in FIGS. 9A and 9B, but altered such that the surfaces 122 and 123 are non reflective and a base 121 is reflective, and with surface 123 is abutted to the base 126 whereby the said surface and base are rendered nonentities. Thus, bodies 120 and 125 correspond to areas of the pi prism labelled 120' and 125' respectively. A light beam labelled 120i is shown to be incident normal to the surface 122' and meets the surface 121' where it is reflected through a first 90° angle; is directed toward a reflective surface 125' where it is reflected through a second 90° angle, but about an axis normal to an axis of the first 90° angle; is directed (downwards in the Figure) to the reflective surface 128' where it is reflected through a third 90° angle about an axis parallel to an axis of the second 90° angle; is directed toward the reflective surface 121' again where it is reflected through a fourth 90° angle, about an axis parallel to the axis of the first 90° angle; and finally is directed to exit the pi prism as a light beam labelled 120r normal to the surface 122'.

Figure 10A:
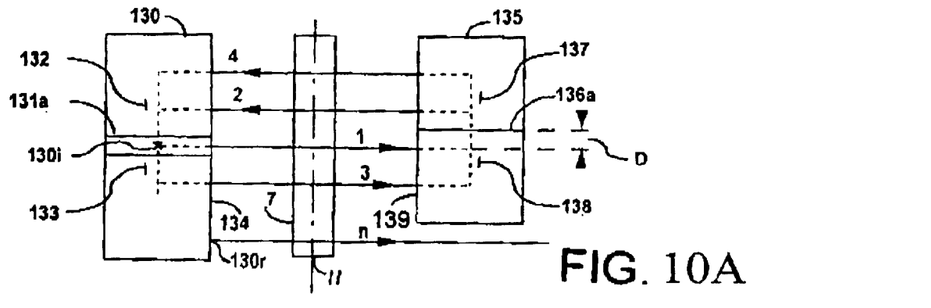
FIG. 10A is a side elevational view of another example of a multi-pass filter unit using a pair of pi prisms each being generally similar to that shown in FIG. 9C.
Figures 10B, 10C:
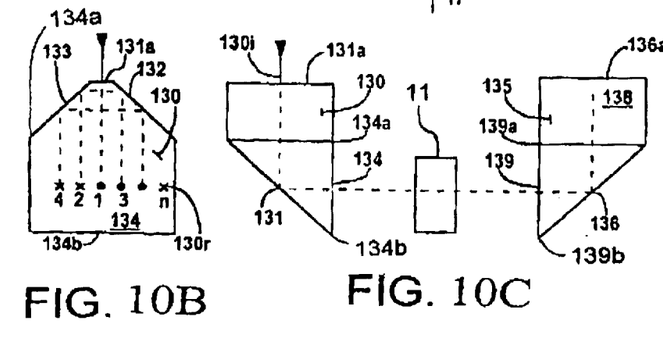
FIGS. 10B, 10C and 10D are further views of the multi-pass filter unit illustrated in FIG. 10A.
Figure 10D:
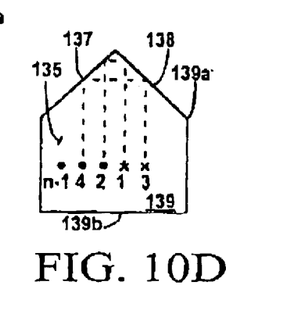

The multi-pass filter unit shown in FIGS. 10A to 10D uses a pair of pi prisms 130 and 135 generally similar to the pi prism shown in FIG. 9C and arranged spaced one each side of an angle-tuned filter element 11. FIG. 10A is a plan view of the multi-pass filter unit and FIG. 10C is a side elevation, while FIGS. 10B and 10D are opposite end elevations. The pi prism 130 includes a reflective surface 133 extending from an edge 134a to converge normal toward a reflective surface 132 and join therewith via a transparent flat surface 131a, as shown in FIG. 10B. Each of the surface 131a, 132 and 133 is joined normal with a transparent flat surface 134 which extends to join with a reflective surface 131 along an edge 134b, defining an interior angle of 45° therewith. The pi prism 135 is similar, and includes a reflective surface 138 extending from am edge 139a to join along an apex at 90° with a reflective surface 137, as shown in FIG. 10D. The surfaces 137 and 138 are joined normal with a transparent flat surface 139 which extends to join with a reflective surface 136 along an edge defining an interior angle of 45° therewith.

FIGS. 10A–10D show only a single multi-reflected light path for convenience of illustration. Operation of the pi prism multi-pass filter unit is illustrated with the light path entering the pi prism 130 as a light beam 130i incident normal to the transparent flat surface 131a. The light path is then reflected from the surface 131 and exits the pi prism 130 via the surface 134. After traversing the angle-tuned filter element 11 a first time, the light path enters the pi prism 135 normal to surface 139 as shown at a point of incidence "1" in FIG. 10D. After reflections from surfaces 136, 138, 137 and 136 again, in that order, it exits the pi prism 135 as shown in FIG. 10D at a point of departure "2". After traversing the angle-tuned filter element 11 a second time, the light path enters the pi prism 130 as shown in FIG. 10B as a point of incidence "2". After reflections from surfaces 131, 133, 132 and 131 again, in that order, it exits the pi prism 131 as shown at a point of departure "3" (FIG. 10B). The light path traverses the angle-tuned filter element 11 a third time and so on, as generally illustrated in FIGS. 10A-10D, until the light path exits via the surface 134 (see FIG. 10A) at a point of egress 130r, also shown as a point of departure "n", to traverse the angle-tuned filter for an nth time. Any energies of a light beam having traversed the angle-tuned filter element 11 for the nth time are directed to and detected by one of the detectors 16 and 17. It should be realized that the multi-pass filter as illustrated will provide for at least another light path by providing another light beam point of incidence laterally spaced from the light beam point of incidence 130i in FIG. 10A and by providing direction from a point of egress spaced vertically from the point of egress 130r in FIG. 10B, to another of the detectors 16 and 17.

It should be appreciated that, of the various multi-pass optics arrangements described hereinbefore, only those shown in FIGS. 2 and 3 provide correction for deviation of the reflector angle from a true right angle, i.e. by ensuring that, for most or all reflections at a surface in a clockwise direction, there are an equal number of reflections in the counterclockwise direction.

It is envisaged that, in any of the embodiments of the invention discussed in the foregoing, the filter element 11 could be doubled or cascaded to yield twice the filter passes of the beam and a further improvement in optical dynamic range.

There are, of course, other ways the two linearly-polarized beams could be produced so long as they are orthogonal components of the input light beam. For example, a birefringent device could be used.

It should also be noted that although FIGS. 1 and 2-7B show the tunable filter rotatable about an axis extending perpendicular to the page and through the middle of the filter, it would be possible to rotate the filter about an axis perpendicular thereto, i.e., in the plane of the page and extending along the length of the filter.

INDUSTRIAL APPLICABILITY

Though the polarization-maintaining multi-pass optical arrangement disclosed herein is particularly advantageous when used, with a polarization-sensitive filter, as part of an OSA instrument, it is believed that the multi-pass optical arrangement could be advantageously used in other applications, especially those requiring wavelength discrimination of optical energy, and in particular polarization insensitive wavelength discrimination, or in Michelson interferometers, optical delay lines, and so on.

A robust, simple optical spectrum analyzer apparatus embodying the invention may provide improved performance and economy, particularly in a portable configuration. An inherent polarization-sensitive characteristic of an angle-tuned filter element is rendered substantially inconsequential by splitting an incident light beam along two paths in dependence upon states of polarizations of energy in the light beam and aligning the states of polarization of energies in the paths to be parallel to one of the principal axes of the angle-tuned filter element. Improved optical rejection ratio is realized by embodiments of the invention using an angle-tuned filter element in juxtaposition with a pair of reflector elements to achieve multiple passes of the two paths through the angle-tuned filter element. Many modifications in the above described embodiments of the invention can be carried out without departing from the spirit thereof, and therefore the scope of the present invention is limited only by the appended claims.

What is claimed is:

1. An optical spectrum analyzer apparatus comprising:
    an inherently polarization-sensitive tunable filter element;
    polarization-maintaining optical means for defining paths whereby a light beam is directed to traverse the polarization-sensitive tunable filter element a predetermined number of times;
    a polarization control module for receiving input light for analysis, decomposing the received input light into its ordinary and extraordinary components to produce fist and second light beams having respective mutually orthogonal liner states of polarization, and applying the first and second light beams to the tunable filter element by way of the optical means with their states of polarization parallel to each other and to one of the principal axes of the tunable filter element,
    means for adjusting the tunable filter element to select different wavelengths of the input light; and
    means for detecting the first and second light beams leaving the tunable filter element without first recombining them optically and detecting energy at each of said different wavelengths,
    wherein the polarization control module comprises means for rotating the state of polarization of at least one of the first and second light beams relative to the state of polarization of the other of the first and second light beams before application to the tunable filter elements, said rotating means comprising at least one polarization-maintaining fiber.

2. An optical spectrum analyzer according to claim 1, wherein the detection means comprises first and second detectors for detecting energies of the first and second light beams, respectively, after their traversal of the polarization-sensitive tunable filter means, and providing corresponding first and second electrical signals, respectively.

3. An optical spectrum analyzer according to claim 2, wherein the detecting means further comprises means for summing the first and second electrical signals.

4. An optical spectrum analyzer according to claim 1, wherein the angle-tuned filter means comprises a Fabry-Perot filter.

5. An optical spectrum analyzer according to claim 1, wherein the angle-tuned filter means comprises a thin film dielectric filter.

6. An optical spectrum analyzer according to claim 1, wherein the multi-pass optical means comprises a pair of right angle reflectors juxtaposed so as to reflect each of said light beam components back and forth between them said predetermined plurality of times while maintaining its polarization state.

7. An optical spectrum analyzer according to claim 6, wherein the pair of right angle reflectors each have a pair of reflective surfaces extending at a right angle to each other, the reflectors being juxtaposed so that a light beam incident upon one of the reflectors obliquely to one of its reflective surfaces will be reflected back and forth between the right angle reflectors to traverse the polarization-sensitive tunable filter means said predetermined plurality of times, the reflectors being offset relative to each other so that, following the plurality of traversals, the light beams enter or leave the multi-pass optics from an outer edge portion of one of the reflectors.

8. An optical spectrum analyzer according to claim 7, wherein at least one of the pair of right angle reflectors includes a planar surface extending substantially perpendicular to the paths taken by the light beams when travelling between the pair of right angle reflectors and truncating the pair of reflective surfaces short of an apex between notional extensions of the surfaces, the planar surface for either receiving or emitting at least one of the light beams.

9. An optical spectrum analyzer according to claim 8, wherein the pair of right angle reflectors is selected from porro prisms, pi prisms and hollow roof mirrors.

10. An optical spectrum analyzer according to claim 7, wherein the pair of right angle reflectors is selected from porro prisms, pi prism and hollow roof mirrors.

11. An optical spectrum analyzer according to claim 6, wherein the pair of right angle reflectors is selected from porro prisms, pi prisms and hollow roof mirrors.

12. An optical spectrum analyzer according to claim 1, wherein the adjusting means is arranged to adjust the filter means to scan a predetermined spectrum of the light beam, and further comprising buffer means connected with the detector means and the adjusting mean for storing indications of detected energies in association with indications of spectral tuning of the filter element.

* * * * *